United States Patent [19]

Yanabu et al.

[11] 4,326,233
[45] Apr. 20, 1982

[54] LIGHTNING ARRESTER

[75] Inventors: Satoru Yanabu, Machida; Susumu Nishiwaki; Toshikazu Satoh, both of Yokohama, all of Japan

[73] Assignee: Tokyo Shibaura Denki Kabushiki Kaisha, Kawasaki, Japan

[21] Appl. No.: 173,478

[22] Filed: Jul. 30, 1980

[30] Foreign Application Priority Data

Aug. 2, 1979 [JP] Japan ................................. 54-98135
Mar. 17, 1980 [JP] Japan ................................. 55-34831

[51] Int. Cl.³ ............................................. H02H 1/04
[52] U.S. Cl. ................................... 361/127; 313/217; 315/36; 361/134
[58] Field of Search ............... 361/127, 126, 120, 130, 361/128, 129, 133, 134; 315/36; 313/217

[56] References Cited

U.S. PATENT DOCUMENTS

| | | | |
|---|---|---|---|
| 3,019,367 | 1/1962 | Kalb | 315/36 |
| 3,072,815 | 1/1963 | Mächler et al. | 361/134 X |
| 3,448,337 | 6/1969 | Kawieki | 361/120 X |
| 3,733,521 | 5/1973 | Kalb | 315/36 X |
| 3,805,114 | 4/1974 | Matsuoka et al. | 361/128 |
| 4,004,193 | 1/1977 | Reckard | 361/128 X |

FOREIGN PATENT DOCUMENTS

| | | | |
|---|---|---|---|
| 1105973 | 5/1961 | Fed. Rep. of Germany | 361/134 |
| 1004717 | 4/1967 | Fed. Rep. of Germany | |
| 1286190 | 1/1969 | Fed. Rep. of Germany | |
| 2843120 | 4/1979 | Fed. Rep. of Germany | |
| 126943 | 10/1979 | Japan | |

OTHER PUBLICATIONS

"Development of a New Type SF6 Gas Lightning Arrester" Toshio Suzuki et al., Feb. 7, 1973, IEEE PES Summer Mtg. and EHV/UHV Conf., C-73-358-9.

Primary Examiner—Reinhard J. Eisenzopf
Attorney, Agent, or Firm—Oblon, Fisher, Spivak, McClelland & Maier

[57] ABSTRACT

A series circuit of a gap section and a valve block is connected between a transmission line and the ground. The valve block consists of a plurality of nonlinear resistor elements connected in series. A first impedance circuit consisting of a resistor and a capacitor connected in series is connected in parallel to the gap section. Also, a second impedance circuit consisting of another resistor and another capacitor connected in parallel is connected in parallel to the valve block. The ratio of the voltage applied across the gap section to that applied across the valve block is determined by the ratio of the impedance of the first impedance circuit to that of the second impedance circuit. A pair of discharge electrodes included in the gap section, which are a prescribed distance apart from each other, comprise a narrower gap region at which spark is started.

8 Claims, 12 Drawing Figures

LIGHTNING ARRESTER

BACKGROUND OF THE INVENTION

This invention relates to a lightning arrester, and more particularly to a lightning arrester for protecting power station equipment from damage caused by lightning disturbances.

With the conventional lightning arrester, a plurality of ZnO base nonlinear resistor elements are connected in series in accordance with the level of the rated voltage to form a valve block. One end of this value block is connected to a line coupled to station equipment requiring protection. The other end of the valve block is grounded. In other words, the conventional lightning arrester is not provided with a spark gap or space. The reson why the spark gap need not be provided is that where voltage impressed in a ZnO base nonlinear resistor element has a lower level than prescribed, then substantially no current flows through the element; and conversely where the voltage exceeds the prescribed level, the ZnO base nonlinear resistor element displays such impressed voltage—current characteristic that a pulsating current flows through the resistor element.

With the known lightning arrester constructed as described above, the spark-starting voltage of the valve block is proportional to the number of series-connected nonlinear resistor elements. In other words, the smaller the number of the resistor elements, the more reduced the spark-starting voltage of the prior art lightning arrester. The reason for this is that the total resistance of the valve block falls more, as the resistor elements decrease in number; under the normal condition, more leak current flows through the valve block, raising the temperature of the valve block. This temperature rise leads to the passage of more leak current, until the valve block is damaged, thus disabling the lightning arrester.

With another type of known lightning arrester, a pair of spatially arranged electrodes are connected in series to the valve block to prevent its thermal breakdown. A space provided between the paired electrodes prevents leak current from flowing through the nonlinear resistor elements of the valve block under the normal condition, thereby saving the resistor elements or the valve block from a thermal breakdown. The level of spark-starting voltage occurring in the above-mentioned inter-electrode space or spark gap varies with the waveform of abnormal surge voltage impressed on a lightning arrester. In other words, where the duration of the wave front of surge voltage is shortened, and a steep rise of lightning current results, then the level of spark-starting voltge is raised, thus desirably reducing the station equipment-protecting property of a lightning arrester.

SUMMARY OF THE INVENTION

It is accordingly the object of this invention to provide a lightning arrester, wherein a spark-starting voltage has a fixed level regardless of the duration of the wave front of abnormal surge voltage impressed on the lightning arrester, and a discharge are appearing in the spark gap or space is prevented from setting at the same location within the spark gap or space.

To attain the above-mentioned object, this invention provides a lightning arrester, wherein a plurality of impedance elements having a predetermined frequency characteristic with respect to abnormal surge voltage are connected in parallel to at least one pair of electrodes arranged with a spark gap as well as to a valve block formed of a plurality of nonlinear resistor elements.

With a lightning arrester according to another embodiment of the invention, the aforesaid paired electrodes are replaced by an assembly of an inner electrode and an outer electrode spatially arranged in a concentric relationship. Both electrodes have a cylindrical outer surface, and are respectively provided with first and second lead electrodes. The first lead electrode fitted to the upper peripheral edge of the inner cylindrical electrode horizontally extends outward in a tangential direction. The inclined portion of the second lead electrode fitted to the upper peripheral edge of the outer cylindrical electrode extends upward curvedly along the peripheral edge. That portion of the second lead electrode which extends horizontally outward in parallel with the aforesaid first lead electrode of the inner cylindrical electrode. A pair of projections are formed on the mutually facing walls of the outer end portions of the first and second lead electrodes of both inner and outer cylindrical electrodes to define a narrow discharge gap between the projections.

DETAILED DESCRIPTION OF THE INVENTION

Figure 1:
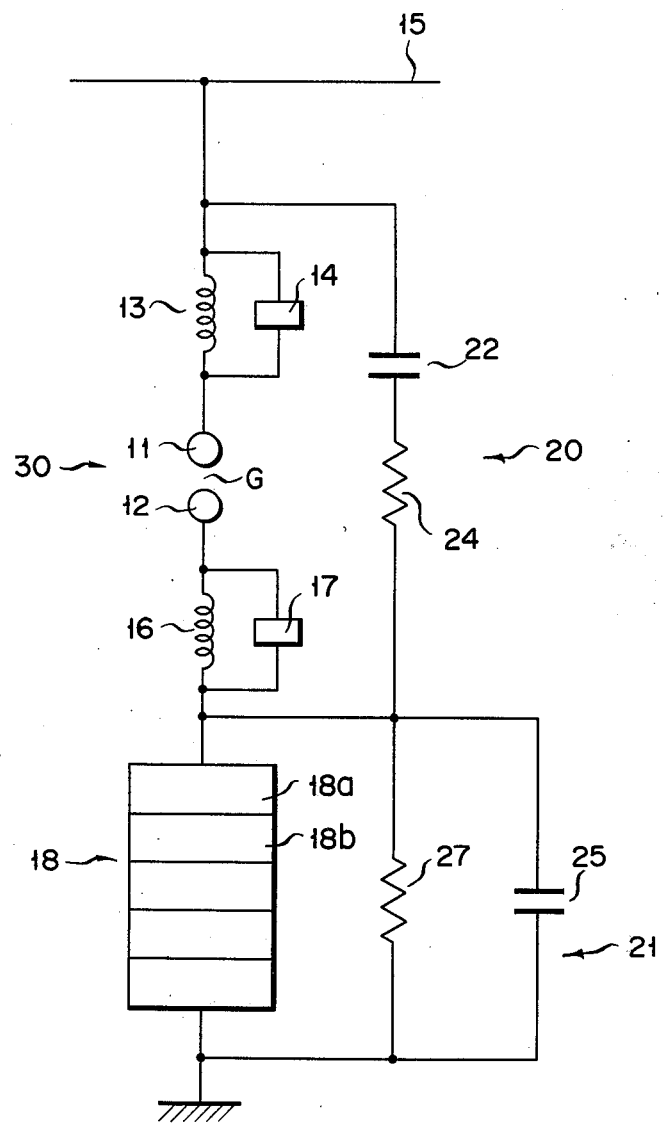
FIG. 1 is a circuit diagram of a lightning arrester according to one embodiment of this invention in which a pair of ring electrodes defining a spark gap therebetween are connected in series to a valve block.

With the embodiment of FIG. 1, a pair of mutually facing cylindrical electrodes 11, 12 are provided with a prescribed spark gap G defined therebetween. The cylindrical electrode 11 is connected to a transmission line 15 through a parallel circuit formed of a blow coil 13 and a shunt resistor 14 prepared from, for example, Silicone Carbide (SiC) base material. The hollow cylindrical electrode 12 is connected to one end of a valve block 18 similarly through a parallel circuit formed of a blow coil 16 and shunt resistor 17. The other end of the valve block 18 is grounded. The valve block 18 is formed of a plurality of series-connected nonlinear resistor elements 18$a$, 18$b$ . . . each prepared from, for example, zinc oxide (ZnO) base material.

An impedance element 20 having a predetermined frequency characteristic with respect to impressed abnormal surge voltage (for example, lightning surge voltage) is electrically connected in parallel with a series circuit consisting of a parallel circuit of the blow coil 13 and shunt resistor 14 and a parallel circuit including the paired cylindrical electrodes 11, 12, blow coil 16 and shunt resistor 17. The other impedance element 21 is electrically connected similarly in parallel with the valve block 18 said impedance element 20 is formed of a series circuit of a capacitor 22 and shunt resistor 24. The other impedance element 21 is constituted by parallel circuit of a capacitor 25 and shunt resistor 27.

Figure 2:
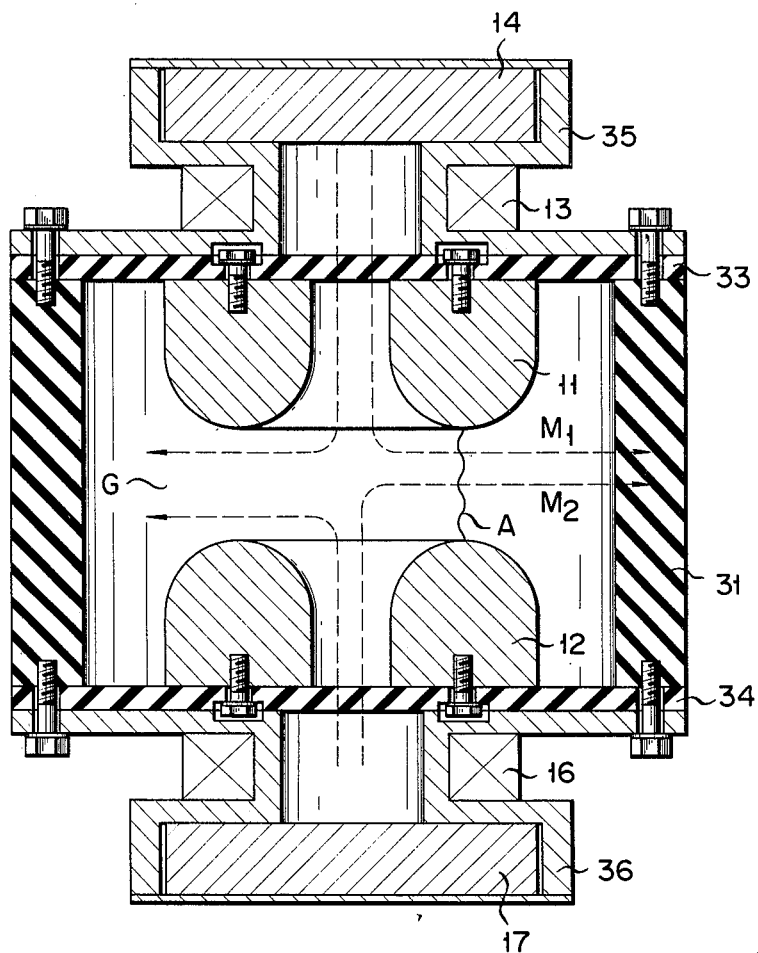
FIG. 2 is an enlarged sectional view of the spark gap section of the first embodiment of FIG. 1.

FIG. 2 is a detailed sectional view of the spark gap section 30 of a lightning arrester according to the embodiment of FIG. 1. The cylindrical electrodes 11, 12 are so arranged as to face each other in the axial direction. The paired cylindrical electrodes 11, 12 are received in an insulating housing 31. This insulating housing 31 and sealing insulators 33, 34 jointly define an airtight chamber, in which the cylindrical electrodes 11, 12 are fixed to the sealing insulators 33, 34. The airtight chamber is filled with, for example, an insulating gas such as sulfur hexafluoride ($SF_6$) gas. A support member 35 carrying the blow coil 13 and shunt resistor 14 is fixed to the upper open end of the insulating housing 31 by means of the sealing insulator 33. A support member 36 carrying the blow coil 14 and shunt resistor 17 is fixed to the lower open end of the insulating housing 31 by means of the sealing insulator 34. The blow coils 13, 16 are wound in the opposite directions to produce magnetic fields $M_1$, $M_2$ repulsing from each other in the axial direction of said blow coils 13, 16.

Where, with the lightning arrester according to the embodiment of FIG. 1 constructed as described above, lightning surge voltage impressed on a transmission line 15 exceeds the level of a spark-starting voltage defined by the spark gap G provided between the cynlindrical electrodes 11, 12, then a discharge arc appears in the spark gap G. Generally, such lightning surge voltage represents a steep rise of current reaching such high voltage level as 500 to 1,000 kilovolts in an extremely short length of time as 1 to 2 microseconds. A current flowing through a lightning arrester is carried through the shunt resistor 14, 17, instead of the blow coils 13, 16, and thereafter to the ground through the valve block 18. Since the steep rise of current resulting from the lightning surge voltage is sustained for an extremely short period of time as 1 to 2 microseconds, the resultant discharge arc produced in the spark gap G is extinguished in as short a time as that for which the above-mentioned steep current rise is continued.

Where the above-mentioned lightning surge voltage is impressed on the transmission line 15, surge voltage is applied to a lightning arrester, and consequently a follow current flows through the spark gap G, then the follow current is continued for a relatively long time (for example, 100 to 5,000 microseconds) and indicates a gently falling waveform. Therefore, the follow current flows through the blow coils 13, 16. The mutually repulsing magnetic fields $M_1$, $M_2$ created by the oppositely wound blow coils 13, 16 are radially spread through a gap defined between the cylindrical electrodes 11, 12. A discharge arc generated in the spark gap G is rotated under a drive force following Fleming's left hand rule which is produced in the circumferential direction of the cylindrical electrodes 11, 12 by the magnetic fields $M_1$, $M_2$. Later when lightning surge voltage disappears, a voltage impressed on the lightning arrester falls. Where said fallen voltage further decreases from the critical voltage of the voltage-current characteristics of the nonlinear resistor elements constituting the valve block 18, then current passing through the spark gap G is extremely reduced to, for example, several milliamperes. Therefore, discharge arc occurring in the spark gap G is shut off by the aforesaid insulating gas of sulfur hexafluoride ($SF_6$) having an arc-extinguishing property.

Now let it be assumed that character a represents the ratio which the level of the voltage impressed on the spark gap G defined between the paired cylindrical electrodes 11, 12 when lightning surge voltage is improssed on the transmission line 15 bears to the level of the voltage applied to the whole of the lightning arrester. Then the voltage ratio a coincides with a ratio between the resistances of the impedance elements 20, 21. With the impedances of these impedance elements 20, 21 respectively expressed as $Z_1$, $Z_2$, then the following equation results.

$$a = \frac{Z_1}{Z_1 + Z_2} \quad (1)$$

The impedances $Z_1$, $Z_2$ may be further expressed as follows.

$$Z_1 = \sqrt{R_1^2 + \left(\frac{1}{\omega C_1}\right)^2} \quad (2)$$

$$Z_2 = \frac{1}{\sqrt{\left(\frac{1}{R_2}\right)^2 + (\omega C_2)^2}} \quad (3)$$

where:
$C_1$ = capacity of the capacitor 22
$R_1$ = resistance of the shunt resistor 24
$C_2$ = capacity of the capacitor 25
$R_2$ = resistance of the shunt resistor 27
$\omega$ = angular frequency of lightning surge voltage Now assuming $C_1 = 50$ [pF], $R_1 = 20$ [k$\Omega$], $C_2 = 200$ [pF], and $R_2 = 9$ [M$\Omega$], and determining the values of the impedances $Z_1$, $Z_2$ from the above equations (2), (3), then the value of the aforesaid ratio a can be measured by substituting the values of the impedances $Z_1$, $Z_2$ in the equation 1.

Figure 3:
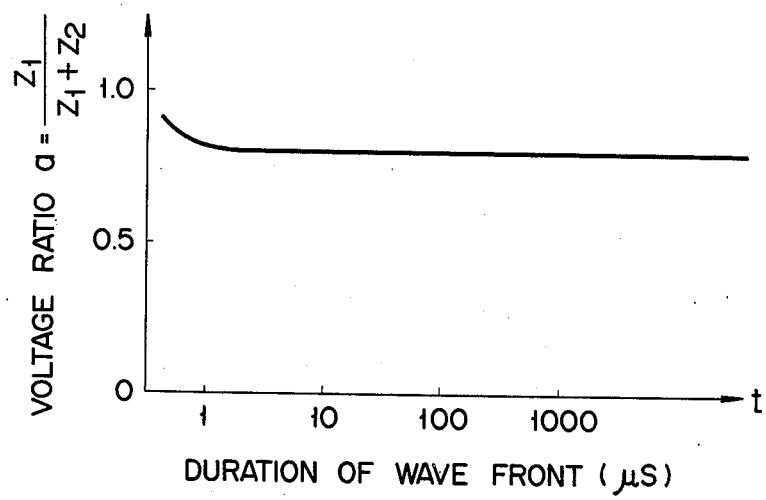
FIG. 3 is a diagram showing an interrelationship between the ratio a which a voltage level impressed on the spark gap bears to that which is applied to the whole of the lightning arrester of FIG. 1 and the duration t of the wave front of surge voltage.
Figure 4:
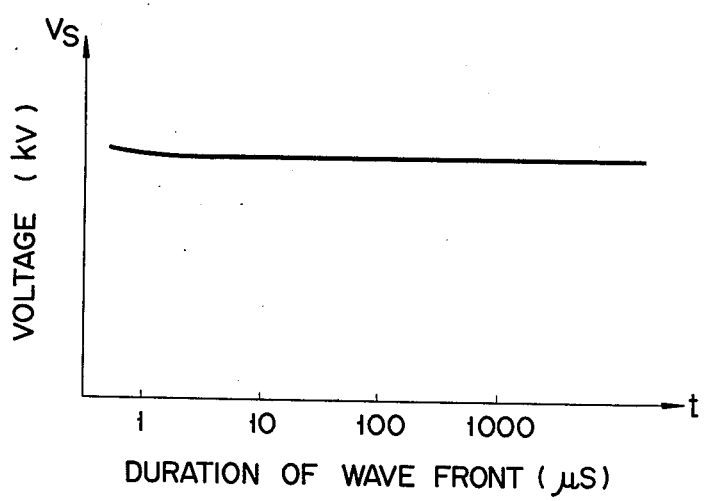
FIG. 4 is a diagram showing the interrelationship between the improved or reduced spark-starting voltage of the lightning arrester of FIG. 1 and the duration t of the wave front of the surge voltage.

The voltage ratio a varies with the angular frequency $\omega$ of lightning surge voltage taken as a parameter. The angular frequency $\omega$ corresponds to a reciprocal of the duration of the wave front of lightning surge voltage. FIG. 3 graphically shows an interrelationship between the duration of the wave front determined from the angular frequency ω and the voltage ratio a. As apparent from the volt-time curve of FIG. 3, the voltage ratio a varies with the duration t (microsecond) of the lightning surge voltage. FIG. 3 further shows that where the duration t of the wave front of lightning surge voltage is reduced to about one microsecond, namely, the waveform of said surge voltage sharply rises and the angular frequency ω has a large value, then the voltage ratio a increases, for example from 0.8 to 0.9 in the volt-time curve shown in FIG. 3. In other words, where the duration of the wave front of lightning surge voltage impressed on a lightning arrester is shortened and the waveform of the voltage sharply rises, then the ratio increases which a voltage impressed on the spark gap defined between the paired cylindrical electrodes 11, 12 bears to a voltage applied to the whole of the lightning arrester. Where the waveform of lightning surge voltage impressed on the spark gap G having a prescribed interval sharply rises, then the level of the spark-starting voltge is increased. In this case, however, a high level of voltage defined by the voltage ratio a is impressed on the spark gap G between the paired cylindrical electrodes 11, 12 to compensate for the increased portion of the spark-starting voltage (namely, the section of the graph of FIG. 3 which represents a smaller value than 1 microsecond). Therefore, the level of a spark-starting voltage impressed on the spark gap G is prevented from rising as is generally the case with the conventional lightning arrester. In other words, with the lightning arrester of this invention, the spark-starting voltage $V_S$ impressed on the spark gap G remains substantially, as illustrated in FIG. 4, regardless of the duration of the wave front of lightning surge voltage. With the present lightning arrester, therefore, a spark-starting voltage is kept substantially unchanged throughout all the durations of the wave fronts of lightning surge voltages impressed on the lightning arrester. Thus, a lightning arrester embodying this invention has the advantages that power station equipment can be more reliably protected from abnormal surge voltage caused by, for example, lightning than has been possible with the conventional lightning arrester; and the present lightning arrester can be easily constructed merely by adding impedance elements comprising passive elements such as a capacitor and a resistor to the prior art lightning arrester, thus simplifying the arrangement and substantially avoiding increased cost.

Figure 5:
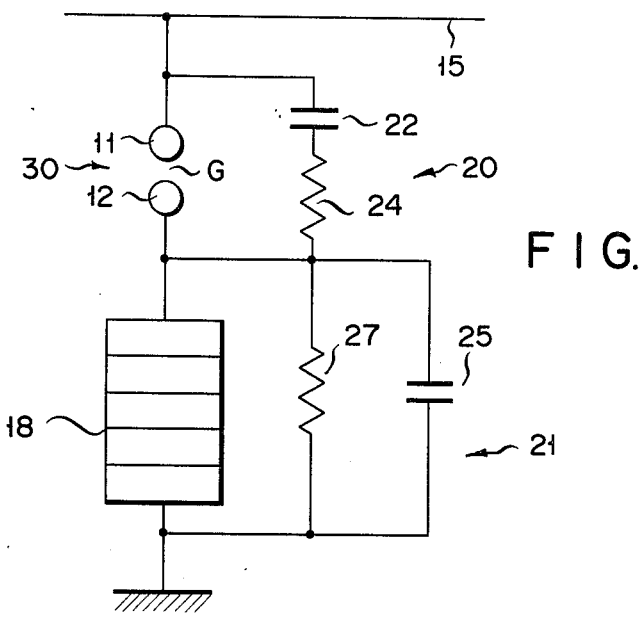
FIG. 5 is a circuit diagram of a lightning arrester according to another embodiment of the invention.

Description is now given with reference to FIG. 5 a lightning arrester according to another embodiment of this invention. The lightning arrester according to the embodiment of FIG. 5 lacks the shunt resistors 14, 17, and blow coils 13, 16 used in the embodiment of FIG. 1.

Namely with the embodiment of FIG. 5, the impedance element 20 consisting of a series circuit of a capacitor 22 and shunt resistor 24 is directtly connected in parallel to the cylindrical electrodes 11, 12. As in the embodiment of FIG. 1. The impedance element 21 constituted by a parallel circuit of a capacitor 25 and shunt resistor 27 is connected in parallel to the valve block 18.

Figure 6:
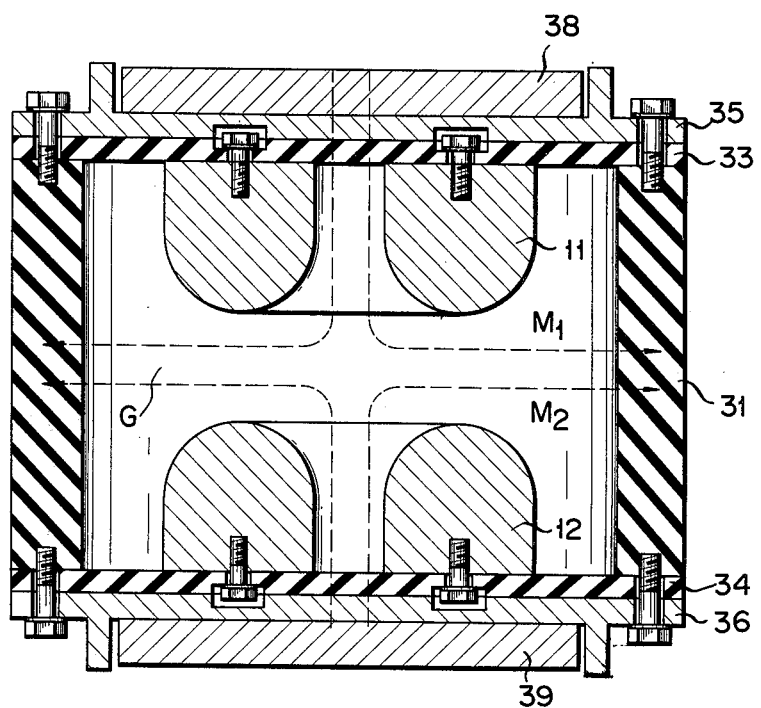
FIG. 6 is an enlarged sectional view of the spark gap section of the lightning arrester of FIG. 5.

FIG. 6 is a detailed sectional view of the spark gap section 30 of the lightning arrester of FIG. 5. The paired cylindrical electrodes 11, 12 are received in an insulating housing 31 filled with an insulating gas such as sulfur hexafluoride ($SF_6$) gas. A support member 35 is fixed to the upper open end of the insulating housing 31 by means of a sealing insulator 33 carrying the cylindrical electrode 11. A support member 36 is fixed to the lower open end of the insulating housing 31 by means of sealing insulator 34 carrying the cylindrical electrode 12. A pair of permanent magnets 38, 39 are respectively set outside of the support members 35, 36. These permanent magnets 38, 39 respectively produce magnetic fields $M_1$, $M_2$ which are repulsed from each other in the axial direction of the cylindrical electrodes 11, 12.

With the lightning arrester according to the embodiment of FIG. 5, the mutually repulsing magnetic fields $M_1$, $M_2$ produced by the permanent magnets 38, 39 respectively permanently prevail through the spark gap G in the radial direction. Where, therefore, lightning surge voltage is impressed on the lightning arrester according to the embodiment of FIG. 5, a stable drive force is applied to a discharge arc generated in the spark gap G. Since the embodiment of FIG. 5 is also provided with the impedance elements 20, 21, the spark-starting voltage $V_S$ remains constant, regardless of the duration of the wave front of lightning surge voltage impressed on the lightning arrester.

Figure 7:
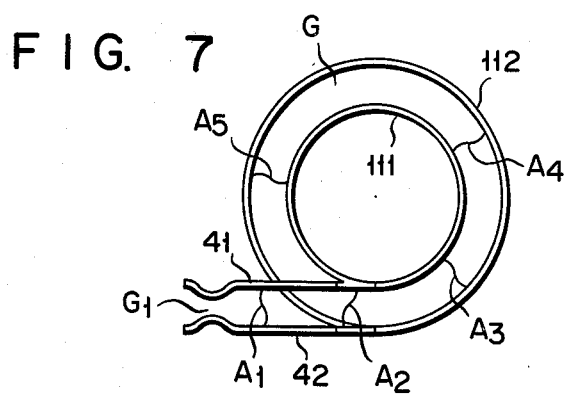
FIG. 7 is a plane view of a modification of a pair of concentrically arranged ring-shaped electrodes provided with a pair of lead electrodes.
Figure 8:
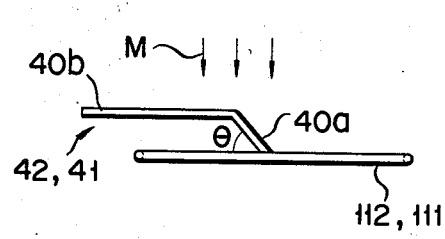
FIG. 8 is a side view of the paired ring-shaped electrodes of FIG. 7.

The paired ring-shaped electrodes illustrated in FIGS. 7 and 8 are used in the same manner as the cylindrical electrodes 11, 12 applied in the embodiment of FIGS. 1 and 2, and the embodiment of FIGS. 5 and 6.

The modification of FIGS. 7 and 8 consists of an inner ring-shaped electrode 111 made of a metal rod with a prescribed diameter and an outer ring-shaped electrode 112 of the same construction. The other ring-shaped electrode 112 is set concentric with the inner ring-shaped electrode 111 and spaced there from by the spark gap G on the same plane. As shown in FIG. 8, the ring-shaped electrodes 111, 112 are respectively provided with tangentially extending lead electrodes 41, 42 having a circular cross section. The horizontal portion 40b of the lead electrodes 41, 42 is set parallel with the ring-shaped electrodes 111, 112. The downward-inclined portion 40a of the lead electrodes 41, 42 defines an angle θ (about 60°) with the horizontal plane of the ring-shaped electrodes 111, 112. The near end portions of the lead electrodes 41, 42 are so curved as to closely face each other to define a narrow discharge gap $G_1$. A single directional magnetic field M is applied in the axial direction of the assembly of the inner and outer ring-shaped electrodes 111, 112.

Figure 9:
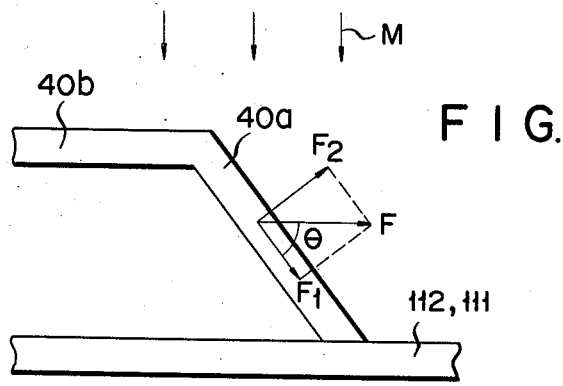
FIG. 9 is an enlarged view of part of the paired concentrically disposed ring-shaped electrodes of FIG. 7.

Where, lightning surge voltage is impressed on a lightning arrester provided with the modified electrodes of FIGS. 7 and 8 constructed as described above, then a discharge arc is first produced in the narrow gap $G_1$. Since the magnetic field M acts perpendicularly to a plane including the paired ring-shaped electrodes 111, 112, a drive force $F_1 = F_{cos} \theta$ shown in FIG. 9 is produced by the action of the magnetic field M in accordance with Fleming's left hand rule. The aforesaid discharge arc is conducted by said drive force $F_1$ first through the lead electrodes 41, 42 and then through an annular space defined between the ring-shaped electrodes 111, 112, as indicated by $A_1, A_2 \ldots A_5$. Since a discharge arc appearing in said annular space defined between the ring-shaped electrodes 111, 112 does not stand at rest in any part of said annular space, noticeable improvement is ensured in the capacity of the present lightning arrester to recover the insulation of the lightning arrester and shut off a follow current after extinction of lightning surge voltage.

Figure 10:
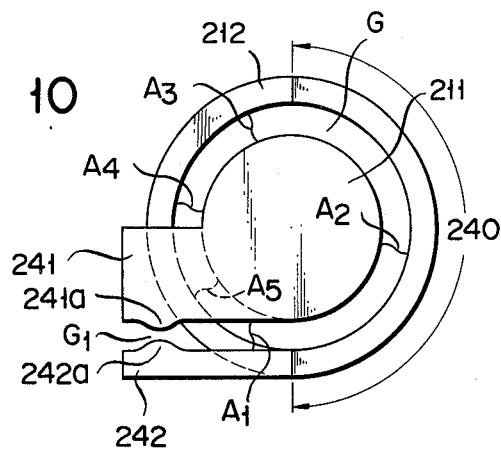
FIG. 10 is a plan view of another modification of the paired concentrically arranged ring-shaped electrodes of FIG. 7, the outer one of which is fitted with a lead electrode curvedly extending along the peripheral edge of said ring-shaped electrode in a state upwardly inclined at a predetermined angle to a horizontal plane.
Figure 11:
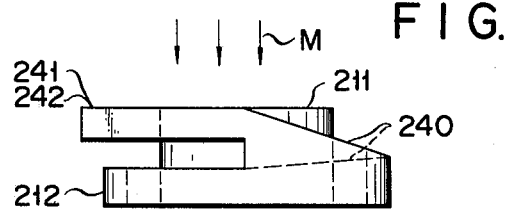
FIG. 11 is a side view of the electrode assembly of FIG. 10.
Figure 12:
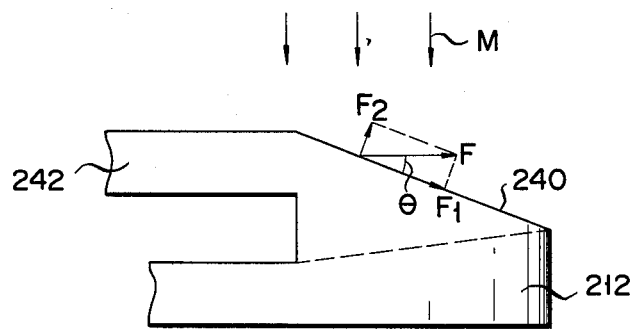
FIG. 12 is an enlarged view of part of the electrode assembly of FIG. 10.

Description is now given with reference to FIGS. 10 and 11 of electrodes 211, 212 further modified from the cylindrical electrodes of FIGS. 1 and 2 and FIGS. 5 and 6. The modification of FIGS. 10 and 11 comprises an inner solid columnar electrode 211 and an outer concentric hollow cylindrical electrode 212, between which an annular spark gap G is defined with a certain width. The outer hollow cylindrical electrode 212 has a smaller height than the inner solid columnar electrode 211. A lead electrode 241 having a square cross section horizontally extends outward from the upper peripheral edge of the inner solid columnar electrode 211 in a tangential direction. A projection 241a is formed on the outer wall of the near end portion of said lead electrode 241. A lead electrode similarly having a square cross section extends curvely along the upper peripheral edge of the outer hollow cylindrical electrode 212. The surface of that portion 240 of said lead electrode 242 which contacts the peripheral edge of the outer hollow cylindrical electrode 212 is inclined upward at as small an angle $\theta$ (less than 30°) as possible to the horizontal plane shown in FIG. 12. That portion of said lead electrode 242 which lies beyond the aforesaid upward inclined portion 240 horizontally extends in parallel with the tangentially extending lead electrode 241. The above-mentioned upward inclined portion 240 extends from the starting point on the peripheral edge of the outer hollow cylindrical electrode 212 to that part of said peripheral edge which faces that point of the peripheral edge of the inner solid columnar electrode 211 at which the lead electrode 241 begins to extend outward in a tangential direction. In other words, the aforesaid upward inclined portion 240 extends along substantially half the circumference of the outer hollow cylindrical electrode 212. A projection 242a is formed near the end of the horizontally extending portion of the lead electrode 242. The projections 241a, 242a closely face each other to define a narrow discharge gap $G_1$.

The inner columnar solid electrode 211, outer hollow cylindrical electrode 212, and lead electrodes 241, 242 are optionally prepared from conductive material such as copper or brass, carbonaceous material such as graphite, or arc-resistant material such as tungsten, or an alloy produced by freely selecting some of the above-listed materials. A magnetic field is applied in the axial direction of the assembly of the inner columnar solid electrode 211 and outer hollow cylindrical electrode 212 by means of, for example, a blow coil or permanent magnet (not shown).

Where lightning surge voltage exceeds a spark-starting voltage occurring in the narrow discharge gap $G_1$ of the modification of FIGS. 10, 11, then a discharge arc first appears in said narrow gap $G_1$. A drive force $F_1 = F_{cos}\theta$ indicated in FIG. 12 which is produced from the magnetic field M in accordance with Fleming's left hand rule causes a discharge arc to be conducted first through the lead electrodes 241, 242, and inclined portion 240 and then through the annular spark gap G as indicated by $A_1, A_2 \ldots A_5$.

With the modification of FIGS. 10, 11, the inner electrode 211 is produced in the solid columnar form, and the outer electrode 212 in the hollow cylindrical form, rendering the resultant lightning arrester rigid in construction. Therefore, this lightning arrester is saved from displacement caused by, for example, externally applied shocks or temperature changes. Further, the narrow discharge gap $G_1$ and annular spark gap G display reliable properties.

Further with the modification of FIS. 10 and 11, the inclination angle the inclined portion 240 of the lead electrode 242 fitted to the outer hollow cylindrical electrode 212 can be easily reduced to a smaller degree than, for example, 10°. Where a drive force F produced by the action of the magnetic field M is vectorially divided, then a large force component $F_1$ is applied toward said inclined portion 240, causing a discharge arc to the carried along said inclined portion 240 at a high speed. This event effectively prevents a discharge arc from stagnating around the inclined portion 240, thereby reducing the burning damage of the electrode material and consequently elongating its effective life.

As described above, this invention provides a lightning arrester wherein a spark-starting voltage is kept at a constant level, regardless of the duration of the wave front of lightning surge voltage; and whose capacity to recover insulation and shut off a follow current in the spark gap is noticeably elevated.

The paired electrodes used with a lightning arrester according to the above-mentioned embodiments were described simple for illustration. The electrodes can of course be modified in various ways. Further, abnormal surge voltage applied to a lightning arrester is not limited to the type resulting from lightning. Obviously, many other forms of abnormal surge voltage can be assumed, for example, the case where abnormal surge voltage takes place due to the internal connection of electric equipment being undesirably grounded by accident.

What we claim is:

1. A lightning arrester which comprises:
   a valve block formed of a plurality of nonlinear resistor elements;
   discharge gap means which is connected in series to said valve block and defines a prescribed space therebetween; and
   impedance circuit means which varies a ratio between a level of voltage impressed on said valve block and that applied to said gap means in accordance with the waveform of lightning surge voltage impressed on the lightning arrester, thereby maintaining the spark-starting voltage of said gap means substantially at a fixed level, said impedance circuit means being formed of at least first and second impedance elements respectively connected in parallel to said valve block and gap means, said first impedance element being constituted by a parallel circuit of a resistor and capacitor, and said second impedance element being formed of a series circuit of a resistor and capacitor.

2. The lightning arrester according to claim 1, wherein said gap means comprises:
   an envelope whose airtight chamber is filled with an insulating gas;
   a pair of cylindrical electrodes spatially arranged in the envelope; and
   circuit means fitted to said envelope and provided with blow coils and resistors, each of the coils and each of the resistors connected to each of said paired cylindrical electrodes.

3. The lightning arrester according to claim 1, wherein said gap means comprises:
   an envelope whose airtight chamber is filled with an insulating gas;
   a pair of cylindrical electrodes spatially arranged in said envelope; and
   permanent magnet means fitted to said envelope and so arranged as to create a magnetic field acting in the axial direction of said paired cylindrical electrodes.

4. The lightning arrester according to any one of claims 2 and 3, wherein said insulating gas is sulfur hexafluoride ($SF_6$) gas.

5. A lighting arrester, which comprises:

a first cylindrical electrode having an upper peripheral edge;

a second hollow cylindrical electrode having a smaller height than said first cylindrical electrode and concentrically surrounding said first cylindrical electrode with such an interval as to provide a discharge gap, said second hollow cylindrical electrode having an upper peripheral edge;

a first lead electrode herizontally extending from the upper peripheral edge of said first cylindrical electrode in a tangential direction and having an outer end provided with a projection;

a second lead electrode whose inclined portion extends upward at a predetermined angle to a horizontal plane curvedly along the upper peripheral edge of said second hollow cylindrical electrode from a portion of said upper peripheral edge at the second hollow cylindrical electrode, and whose horizontal portion is arranged in parallel with said first lead electrode in the same plane and similarly provided with a projection, and the projections of said first and second lead electrodes closely facing each other to define a narrow discharge gap; and means for generating a magnetic field acting in the axial direction of said first and second cylindrical electrodes to conduct a discharge arc produced upon receipt of a lightning surge voltage in said narrow discharge gap defined between said closely facing projections of said first and second lead electrodes first through a discharge gap defined between the inner wall of said upward inclined portion of said second lead electrode and the outer peripheral wall of said first cylindrical electrode which faces said upward inclined portion of said second lead electrode, and thereafter through a circular gap defined between said inner wall of said second hollow cylindrical electrode and said outer wall of said first cylindrical electrode.

6. A lightning arrester according to claim 5, wherein said first and second cylindrical electrodes and said first and second lead electrodes are formed of any of the group consisting of conducting material, carbonaceous material and arc-resistant metal or an alloy thereof.

7. A lightning arrester according to claim 5, wherein the upward extending portion of said second lead electrode is inclined at an angle of about 10 degrees to a horizontal plane.

8. A lightning arrester according to claim 5, wherein said upward inclined portion of said second lead electrode extends along at least half the circumference of said second outer hollow cylindrical electrode.

* * * * *